(12) United States Patent
Hill et al.

(10) Patent No.: US 9,972,459 B1
(45) Date of Patent: May 15, 2018

(54) TACTILE SWITCH ASSEMBLY IN AN ELECTRONIC DEVICE

(71) Applicant: Apple Inc., Cupertino, CA (US)

(72) Inventors: Matthew D. Hill, Cupertino, CA (US); Matthew P. Rao, Cupertino, CA (US); Alex M. Lee, Cupertino, CA (US); Benjamin J. Pope, Cupertino, CA (US); Jared M. Kole, Cupertino, CA (US); Scott A. Myers, Cupertino, CA (US); Stefan C. Mag, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 222 days.

(21) Appl. No.: 14/480,276

(22) Filed: Sep. 8, 2014

Related U.S. Application Data

(60) Provisional application No. 61/875,573, filed on Sep. 9, 2013.

(51) Int. Cl.
| | |
|---|---|
| *H01H 13/34* | (2006.01) |
| *H01H 13/10* | (2006.01) |
| *H01H 13/14* | (2006.01) |
| *H01R 33/955* | (2006.01) |
| *G06K 9/00* | (2006.01) |
| *H01H 11/00* | (2006.01) |

(52) U.S. Cl.
CPC ......... *H01H 13/10* (2013.01); *G06K 9/00013* (2013.01); *H01H 11/00* (2013.01); *H01H 13/14* (2013.01); *H01R 33/955* (2013.01); *H01H 2207/004* (2013.01); *H01H 2209/01* (2013.01); *H01H 2215/004* (2013.01); *H01H 2227/036* (2013.01); *H01H 2239/01* (2013.01); *H01H 2239/074* (2013.01)

(58) Field of Classification Search
CPC ............. H01H 13/26; H01H 2207/004; H01H 2209/01; H01H 2215/004; H01H 2215/012; H01H 2215/02; H01H 2227/036; H01H 2239/01; H01H 2239/074; H01R 33/955; G06K 9/00013
USPC ................................................ 200/341, 600
See application file for complete search history.

(56) References Cited

U.S. PATENT DOCUMENTS

| | | | |
|---|---|---|---|
| 3,051,805 | A | 8/1962 | Binford |
| 3,170,049 | A | 2/1965 | Clavel |
| 3,273,091 | A | 9/1966 | Wales, Jr. |
| 3,295,023 | A | 12/1966 | Peras |
| 3,678,425 | A | 7/1972 | Holmes, Jr. |

(Continued)

*Primary Examiner* — Felix O Figueroa
(74) *Attorney, Agent, or Firm* — David K. Cole

(57) ABSTRACT

A tactile switch assembly can include a tactile switch structure electrically connected to one end of a flexible circuit. The tactile switch assembly has a first length when the flexible circuit is in an unfolded state and a smaller second length when the flexible circuit is in a folded state. The flexible circuit folds over itself one or more times in the folded state. The tactile switch structure can include a stiffener positioned over a switch. The flexible circuit can extend over at least a portion of a top surface of the stiffener and wrap around the stiffener at a bend region and extend under at least a portion of a bottom surface of the stiffener. One or more component chambers can be created in openings in the stiffener that provide additional locations for one or more electrical components to be electrically connected to the flexible circuit.

12 Claims, 7 Drawing Sheets

(56) References Cited

U.S. PATENT DOCUMENTS

| | | | |
|---|---|---|---|
| 4,179,593 A | 12/1979 | Tsunefuji | |
| 4,296,394 A | 10/1981 | Ragheb | |
| 4,300,026 A | 11/1981 | Bull | |
| 4,319,107 A | 3/1982 | Haskins | |
| 4,359,611 A | 11/1982 | Haskins | |
| 4,395,610 A | 7/1983 | Downs et al. | |
| 5,559,311 A | 9/1996 | Gorbatoff | |
| 5,692,044 A | 11/1997 | Hughes et al. | |
| 5,969,309 A | 10/1999 | Nishimura et al. | |
| 6,040,748 A | 3/2000 | Gueissaz | |
| 6,469,602 B2 | 10/2002 | Ruan et al. | |
| 6,492,602 B2 * | 12/2002 | Asai | H01H 13/14 200/1 B |
| 6,522,773 B1 * | 2/2003 | Houdeau | G06K 9/0002 340/5.83 |
| 6,538,539 B1 | 3/2003 | Lu | |
| 6,621,016 B2 * | 9/2003 | Ohba | H01H 25/041 200/11 R |
| 6,642,459 B2 | 11/2003 | Chou et al. | |
| 6,849,817 B2 | 2/2005 | Takata et al. | |
| 7,019,225 B2 * | 3/2006 | Matsumoto | H01H 13/702 200/16 R |
| 7,532,096 B2 | 5/2009 | Zindler | |
| 7,555,150 B2 * | 6/2009 | Ikeda | G06K 9/00013 382/115 |
| 8,124,897 B2 * | 2/2012 | Bollmann | G06F 3/0202 200/310 |
| 8,284,003 B2 | 10/2012 | Klossek et al. | |
| 8,581,679 B2 | 11/2013 | Min et al. | |
| 2015/0334859 A1 * | 11/2015 | Lee | H05K 5/0247 361/679.01 |

* cited by examiner

TACTILE SWITCH ASSEMBLY IN AN ELECTRONIC DEVICE

CROSS-REFERENCE TO RELATED APPLICATION

This application is a nonprovisional patent application of and claims the benefit to U.S. Provisional Patent Application No. 61/875,573, filed Sep. 9, 2013 and titled "Tactile Switch Assembly in an Electronic Device," the disclosure of which is hereby incorporated by reference herein in its entirety.

TECHNICAL FIELD

The present invention relates to input devices, and more particularly to a tactile switch assembly in an electronic device.

BACKGROUND

The size of various types of electronic devices, such as portable electronic devices, continues to decrease while the number of functions and features in the electronic devices increases. The use of space in an electronic device has therefore become an aspect of the electronic device that must be optimized. It can be difficult to increase the number of electronic components and circuitry in the electronic device as the size of the device becomes smaller and thinner.

SUMMARY

In one aspect, a tactile switch assembly can include a tactile switch structure electrically connected to one end of a flexible circuit. The tactile switch assembly has a first length when the flexible circuit is in an unfolded state and a smaller second length when the flexible circuit is in a folded state. The flexible circuit folds over itself one or more times in the folded state. The tactile switch structure can include a stiffener positioned over a switch. The flexible circuit can extend over at least a portion of a top surface of the stiffener and wrap around the stiffener at a bend region and extend under at least a portion of a bottom surface of the stiffener. One or more component chambers can be created in openings in the stiffener that provide additional locations for one or more electrical components to be electrically connected to the flexible circuit.

In another aspect, a tactile switch assembly can include a tactile switch structure electrically connected to one end of a flexible circuit. The tactile switch structure can include a switch electrically connected to a portion of the flexible circuit. The tactile switch assembly can have a first length when the flexible circuit is in an unfolded state and a smaller second length when the flexible circuit is in a folded state. The flexible circuit includes an accordion fold section comprising a plurality of bend regions when the flexible circuit is in the folded state.

In another aspect, a tactile switch structure can include a flexible circuit extending over at least a portion of a top surface of a stiffener. The flexible circuit can bend around the stiffener at a bend region and extend under at least a portion of a bottom surface of the stiffener. At least one component chamber can be created in an opening in the stiffener, the component chamber being surrounded by the stiffener, the flexible circuit extending over the top surface of a stiffener, and the flexible circuit extending under at least a portion of the bottom surface of the stiffener.

And in yet another aspect, a method for constructing a tactile switch structure can include extending a flexible circuit over a top surface of a stiffener in the tactile switch structure, and folding the flexible circuit around the stiffener at a bend region and extending the flexible circuit under at least a portion of a bottom surface of the stiffener. At least one component chamber can be created in an opening in the stiffener, the component chamber being surrounded by the stiffener, the flexible circuit extending over the top surface of a stiffener, and the flexible circuit extending under at least a portion of the bottom surface of the stiffener.

BRIEF DESCRIPTION OF THE DRAWINGS

Embodiments of the invention are better understood with reference to the following drawings. The elements of the drawings are not necessarily to scale relative to each other. Identical reference numerals have been used, where possible, to designate identical features that are common to the figures.

DETAILED DESCRIPTION

Embodiments described herein provide a tactile switch assembly that can include a tactile switch structure connected to one end of a flexible circuit. A connector, such as a board-to-board connector, can be connected to the other end of the flexible circuit. The flexible circuit can be folded over itself one or more times to reduce the amount of space the tactile switch assembly fills in an electronic device. The folded flexible circuit can provide one or more circuit areas where additional electrical components can be electrically connected to the flexible circuit. Additionally or alternatively, the flexible circuit can be used to create one or more component chambers in the tactile switch structure that allow for additional electronic circuitry to be nested in the tactile switch structure and electrically connected to the flexible circuit.

Directional terminology, such as "top", "bottom", "front", "back", "leading", "trailing", etc., is used with reference to the orientation of the Figure(s) being described. Because components of embodiments described herein can be positioned in a number of different orientations, the directional terminology is used for purposes of illustration only and is in no way limiting. When used in conjunction with layers of a device, the directional terminology is intended to be construed broadly, and therefore should not be interpreted to preclude the presence of one or more intervening layers or other intervening features or elements. Thus, a given layer that is described as being formed, positioned, disposed on or over another layer, or that is described as being formed, positioned, disposed below or under another layer may be separated from the latter layer by one or more additional layers or elements.

Figure 1:
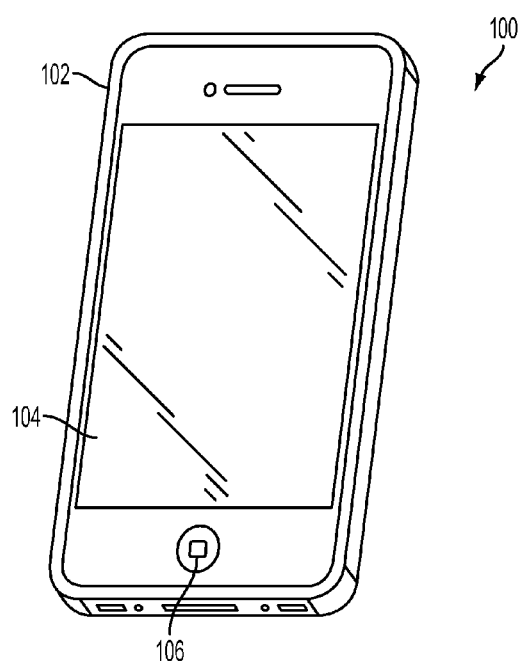
FIG. 1 illustrates an example electronic device that can include a tactile switch assembly.

Referring now to FIG. 1, there is shown a perspective view of one example of an electronic device that can include a tactile switch assembly. In the illustrated embodiment, the electronic device 100 is implemented as a smart telephone. Other embodiments can implement the electronic device differently, such as, for example, as a laptop or desktop computer, a tablet computing device, a gaming device, a remote control device, and other types of electronic and input devices.

The electronic device 100 includes an enclosure 102 at least partially surrounding a display 104 and one or more buttons 106 or input devices. The enclosure 102 can form an outer surface or partial outer surface and protective case for the internal components of the electronic device 100, and may at least partially surround the display 104. The enclosure 102 can be formed of one or more components operably connected together, such as a front piece and a back piece. Alternatively, the enclosure 102 can be formed of a single piece operably connected to the display 104.

The display 104 can be implemented with any suitable technology, including, but not limited to, a multi-touch sensing touchscreen that uses liquid crystal display (LCD) technology, light emitting diode (LED) technology, organic light-emitting display (OLED) technology, organic electroluminescence (OEL) technology, or another type of display technology. The button 106 can take the form of a home button, which may be a mechanical button, a soft button (e.g., a button that does not physically move but still accepts inputs), an icon or image on a display, and so on. Further, in some embodiments, the button 106 can be integrated as part of a cover glass of the electronic device. In one embodiment, a tactile switch assembly can be included in the button 106.

Figure 2:
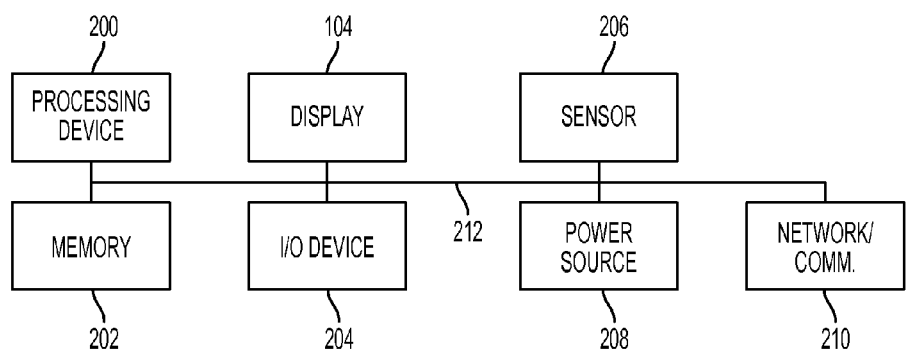
FIG. 2 is a block diagram of the electronic device shown in FIG. 1.

FIG. 2 is an illustrative block diagram of the electronic device 100 shown in FIG. 1. The electronic device 100 can include the display 104, a processing device 200, memory 202, an input/output (I/O) device 204, a sensor 206, a power source 208, and a network communications interface 210. The display 104 may provide an image or video output for the electronic device 100. The display may also provide an input region for one or more input devices, such as, for example, a touch sensing device and/or a fingerprint sensor. The display 104 may be substantially any size and may be positioned substantially anywhere on the electronic device 104.

The processing device 200 can control some or all of the operations of the electronic device 100. The processing device 200 can communicate, either directly or indirectly, with substantially all of the components of the electronic device 100. For example, a system bus or signal line 212 or other communication mechanisms can provide communication between the processing device 200, the memory 202, the I/O device 204, the sensor 206, the power source 208, and/or the network communications interface 210. The processing device 200 can be implemented as any electronic device capable of processing, receiving, or transmitting data or instructions. For example, the processing device 200 can be a microprocessor, a central processing unit (CPU), an application-specific integrated circuit (ASIC), a digital signal processor (DSP), or combinations of such devices. As described herein, the term "processing device" is meant to encompass a single processor or processing unit, multiple processors, multiple processing units, or other suitably configured computing element or elements.

The memory 202 can store electronic data that can be used by the electronic device 100. For example, a memory can store electrical data or content such as, for example, audio and video files, documents and applications, device settings and user preferences, timing signals, biometric images such as fingerprint images, data structures or databases, and so on. The memory 202 can be configured as any type of memory. By way of example only, the memory can be implemented as random access memory, read-only memory, Flash memory, removable memory, or other types of storage elements, or combinations of such devices.

The I/O device 204 can transmit and/or receive data to and from a user or another electronic device. One example of an I/O device is button 106 in FIG. 1. The I/O device(s) 204 can include a display, a touch sensing input surface such as a trackpad, one or more buttons, one or more microphones or speakers, one or more ports such as a microphone port, and/or a keyboard.

The electronic device 100 may also include one or more sensors 206 positioned substantially anywhere on the electronic device 100. The sensor or sensors 206 may be configured to sense substantially any type of characteristic, such as but not limited to, images, pressure, light, touch, heat, movement, relative motion, biometric data, and so on. For example, the sensor(s) 208 may be an image sensor, a heat sensor, a light or optical sensor, an accelerometer, a pressure transducer, a gyroscope, a magnet, a health monitoring sensor, and so on. In one embodiment, a biometric sensor such as a fingerprint sensor can be included in button 106 shown in FIG. 1.

The power source 208 can be implemented with any device capable of providing energy to the electronic device 100. For example, the power source 208 can be one or more batteries or rechargeable batteries, or a connection cable that connects the remote control device to another power source such as a wall outlet.

The network communication interface 210 can facilitate transmission of data to or from other electronic devices. For example, a network communication interface can transmit electronic signals via a wireless and/or wired network connection. Examples of wireless and wired network connections include, but are not limited to, cellular, Wi-Fi, Bluetooth, IR, and Ethernet.

It should be noted that FIGS. 1 and 2 are illustrative only. In other examples, an electronic device may include fewer or more components than those shown in FIGS. 1 and 2.

In some embodiments, a tactile switch assembly can be included in an input device or can be an input device in an electronic device. For example, a tactile switch assembly can be included in the button 106 shown in FIG. 1. The tactile switch assembly can provide a tactile switch for the button 106, and can include other components and features. For example, the tactile switch assembly can include a sensor, such as a fingerprint sensor or a thermal sensor. The tactile switch assembly can include various electrical components that are electrically connected to a flexible circuit. The flexible circuit can be folded over itself one or more times to reduce the amount of space the tactile switch assembly requires in an electronic device. Additionally, the flexible circuit can be used to create one or more component chambers in the tactile switch structure that allow for additional electronic circuitry to be included in the tactile switch structure.

Figure 3:
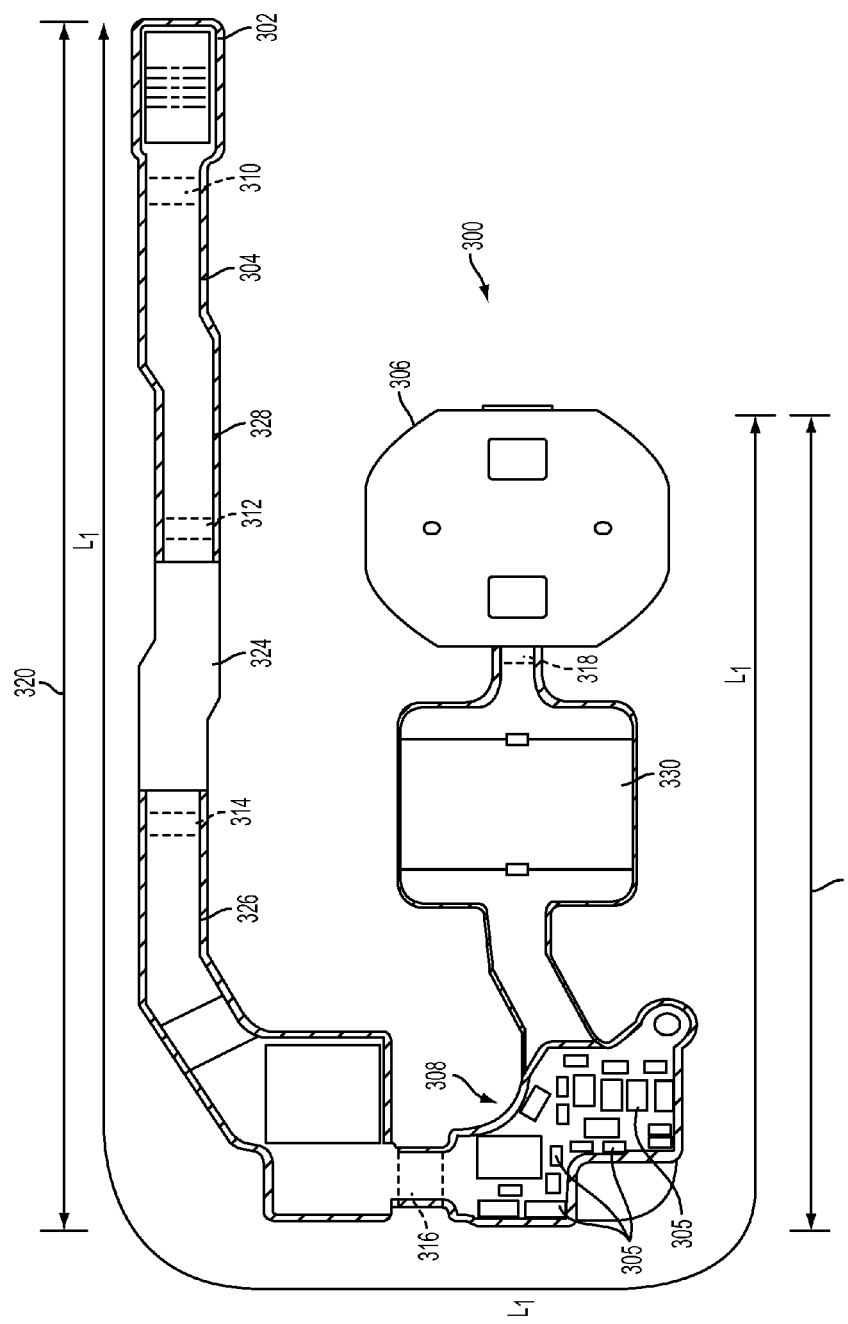
FIG. 3 illustrates a flexible circuit of a tactile switch assembly in an unfolded state.
Figure 4:
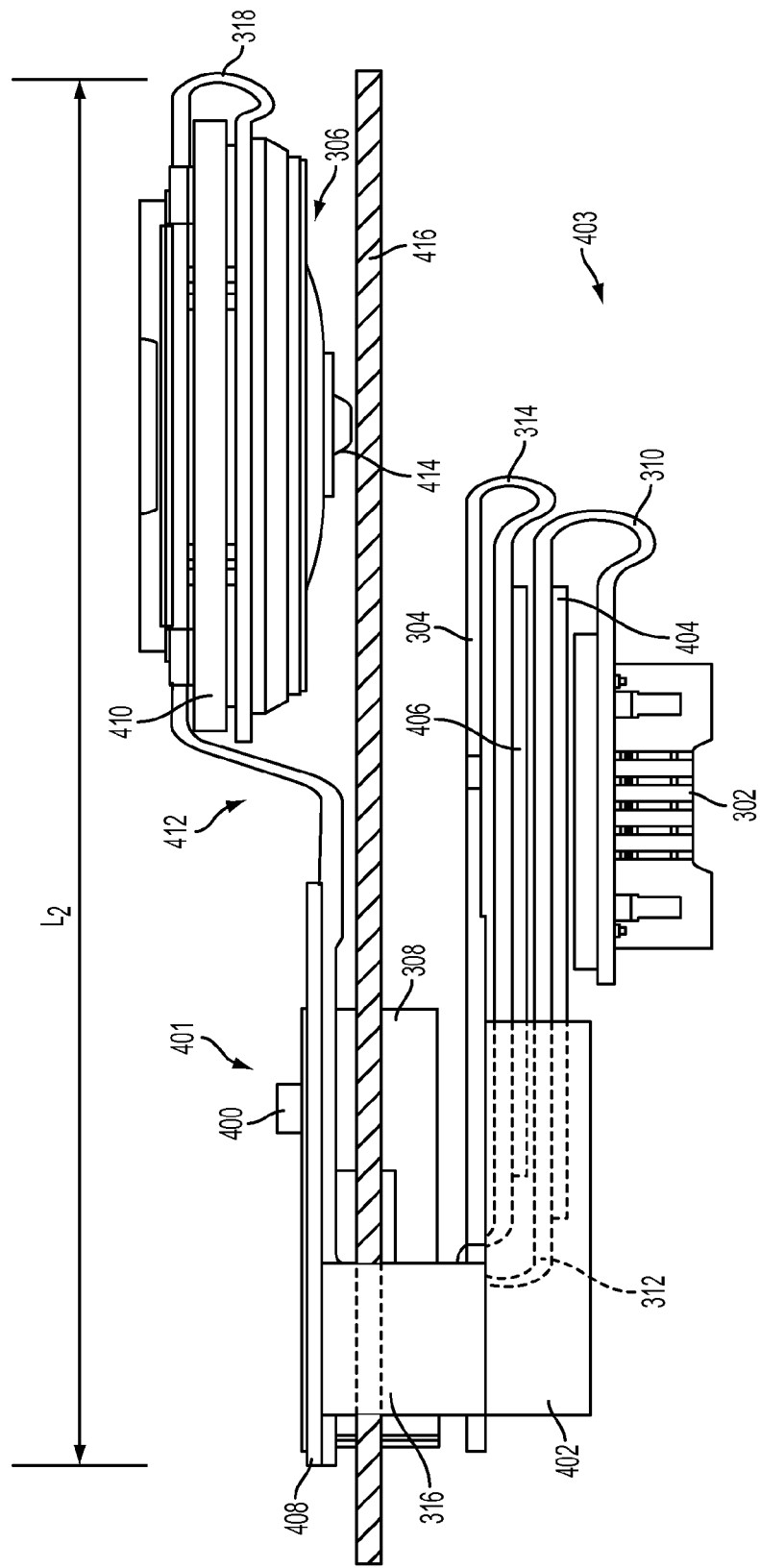
FIG. 4 depicts a side view of the tactile switch assembly with the flexible circuit in a folded state.

Referring now to FIG. 3, there is shown a flexible circuit of a tactile switch assembly in an unfolded state. FIG. 4 depicts a side view of the tactile switch assembly with the flexible circuit in a folded state. With reference to FIGS. 3 and 4, a tactile switch assembly 300 includes a connector 302 electrically connected to one end of a flexible circuit 304 and a tactile switch structure 306 electrically connected to the other end of the flexible circuit 304. Only a portion of the tactile switch structure 306 is shown in FIGS. 3 and 4. The connector 302 can be a board to board connector in some embodiments. The bottom surface of the connector 302 and a top surface of the tactile switch structure 306 are shown in FIG. 3.

One or more electrical components 305 can be connected to the flexible circuit 304 in a first circuit area 308. Additionally or alternatively, one or more electrical components 400 can be electrically connected to the flexible circuit 304 in a second circuit area 401 (see FIG. 4). And in some embodiments, one or more electrical components can be electrically connected to the flexible circuit 304 in a third circuit area 402 (outlined by the box in FIG. 4).

In the unfolded state, the tactile switch assembly has a first length $L_1$. When folded for inclusion in an electronic device, the tactile switch assembly has a shorter second length $L_2$. The flexible circuit 304 can fold over itself multiple times at bend regions 310, 312, 314, 316, and 318 to produce the smaller length $L_2$. The flexible circuit 304 can be folded to produce the structure shown in FIG. 4 by folding section 320 under section 322 at bend region 316. Section 324 can then be folded with respect to section 326 at bend region 314, and section 328 folded over the opposite side of section 324 at bend region 312. Connector 302 is then folded over the opposite side of section 328 at bend region 310. And tactile switch structure 306 is folded with respect to section 330 at bend region 318.

FIG. 4 illustrates the accordion fold of the flexible circuit 304. The flexible circuit 304 can include an accordion fold section 403 formed by the bend regions 310, 312, 314. In some embodiments, stiffeners 404, 406 can be attached to portions of the flexible circuit 304 in the accordion fold section 403. The stiffener 404 can attach to region 328 while the stiffener 406 can attach to region 324. Regions 324 and 328 become more rigid when the stiffeners 404 and 406, respectively, are attached to the regions. The position and/or length of the stiffeners 404, 406 can define the locations and bend radii of the bend regions 310, 312, and 314.

In some embodiments, stiffeners 408, 410 can be attached to the flexible circuit 304 to provide increased rigidity to the flexible circuit. The stiffeners 408, 410 can assist in stabilizing a dynamic region 412 of the flexible circuit 304. The dynamic region 412 can be an unsupported region of the flexible circuit 304 positioned between the stiffener 408 and the stiffener 410. The stiffeners 408, 410 can limit movement of the dynamic region 412 in the z-direction (up and down) as well as in the x-y directions. The stiffeners 404, 406, 408, 410 can each be made of any suitable material, such as metal, plastic, or a composite material.

The tactile switch structure 306 can include any suitable tactile switch. For example, the tactile switch can be a dome switch 414 that is positioned at a bottom surface of the tactile switch structure in one embodiment. The dome switch 414 can be supported by a support plate 416. When a force is applied to the tactile switch structure (e.g., by pressing on button 106), the dome switch is pressed against the support plate 416, which can cause the dome switch to collapse and activate the switch. Other embodiments can use a different type of switch, such as, for example, a force sensing switch. The tactile switch structure 306 is described in more detail in conjunction with FIGS. 8 and 9.

Figure 5:
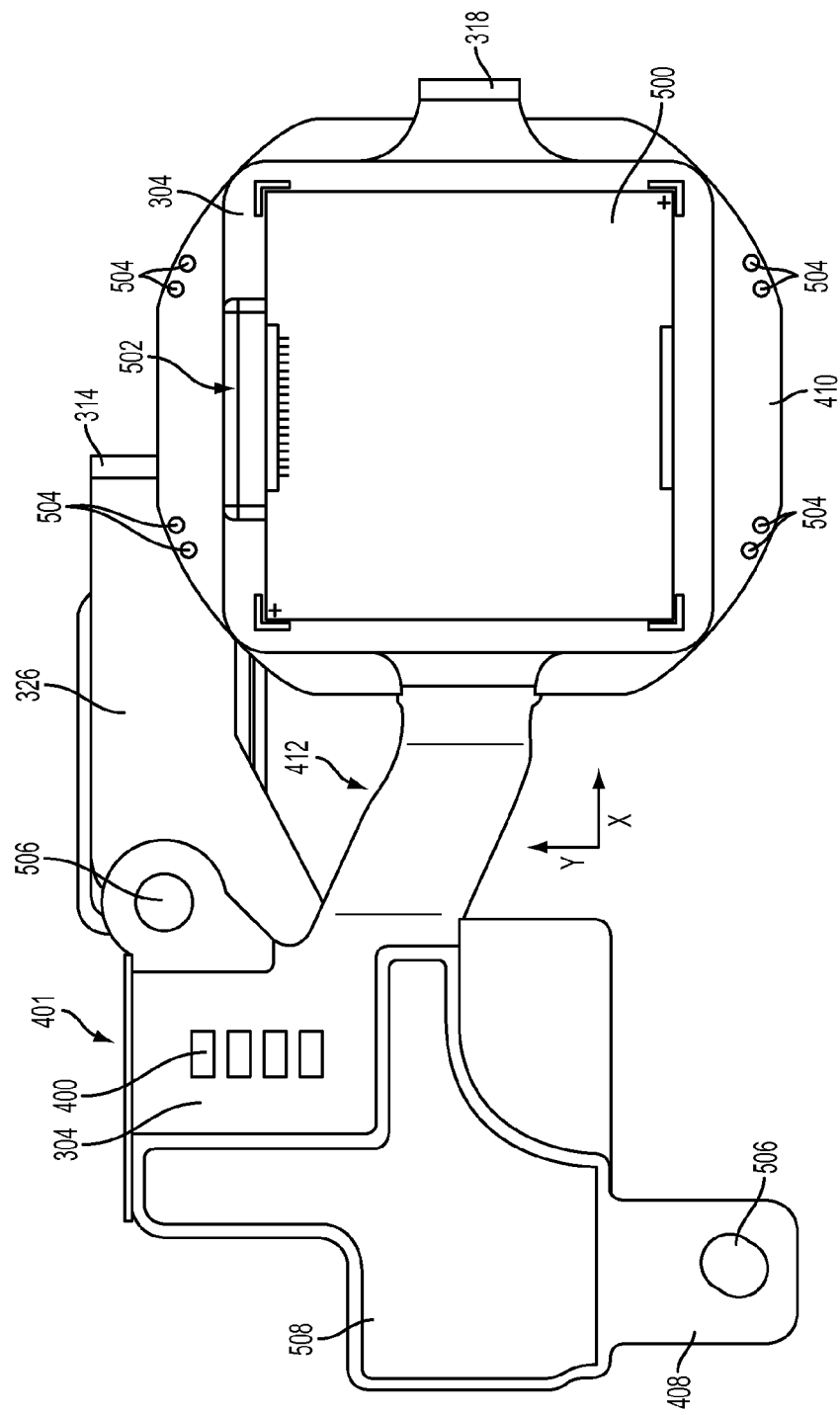
FIG. 5 illustrates a top view of the tactile switch assembly with the flexible circuit in a folded state.

Referring now to FIG. 5, there is shown a top view of the tactile switch assembly with the flexible circuit in a folded state. The stiffener 408 can cover a portion of the flexible circuit 304, leaving room for one or more electrical components 400 to be electrically connected to the flexible circuit in the second circuit area 401. The stiffener 408 can have any given dimensions and shape.

An integrated circuit or sensor 500 can be attached to the top surface of the tactile switch structure 306. In one embodiment, the sensor 500 is a fingerprint sensor. Other embodiments can use a different type of sensor, such as a thermal sensor. The flexible circuit 304 is disposed under the sensor 500. Wire bonds 502 can electrically connect the sensor 500 to the flexible circuit 304.

Attachment points 504 illustrate locations where the stiffener 410 can attach to a trim (not shown). In one embodiment, the stiffener 410 can be welded to the trim at the attachment points 504.

The stiffener 408 can include alignment openings 506. The alignment openings 506 can be used to control the alignment of the flexible circuit 304 to a housing or a cover glass (not shown). Proper alignment of the flexible circuit 304 can reduce or prevent torsion on the dynamic region 412 of the flexible circuit, and can reduce the distance the dynamic region 412 moves in the x and y directions.

An adhesive layer 508 can be disposed over a portion of the stiffener 408 and along a top surface of the region 326 of the flexible circuit 304. The adhesive layer 508 can attach to a surface of a housing in the electronic device. For example, the adhesive layer 508 can be affixed to a cover glass sub-assembly in the electronic device shown in FIG. 1.

Figure 6:
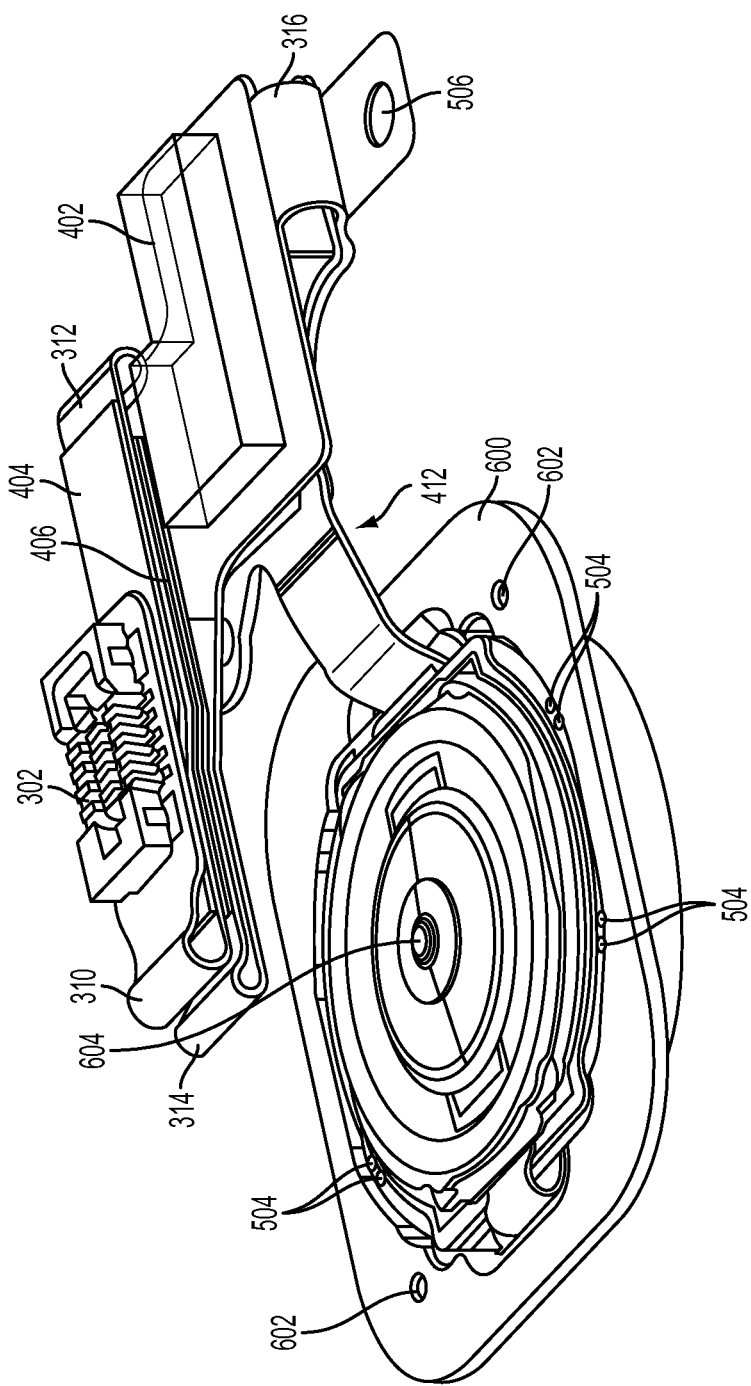
FIG. 6 is a perspective bottom view of the tactile switch assembly shown in FIG. 4.

FIG. 6 is a perspective bottom view of the tactile switch assembly shown in FIG. 4. As described earlier, the stiffener 410 (not shown in FIG. 6) can be attached to a trim 600 at attachment points 504. In one embodiment, the stiffener 410 can be welded to the trim 600 at the attachment points 504. Other embodiments can include any number of attachment points that can be positioned at any given location on the trim 600.

The trim can include alignment marks 602 that can be used for alignment at one or more assembly steps during the construction of the tactile switch assembly and/or an electronic device. As one example, the alignment marks 602 can be used to properly align the trim 600 to obtain a suitable environmental seal around the tactile switch assembly 300 and/or the tactile switch structure 306. As another example, the alignment marks 602 can be used to properly align the trim 600 to a housing in the electronic device. Other embodiments can include any number of alignment marks that can be positioned at any given location on the trim 600.

As described earlier, the tactile switch structure 306 includes a dome switch 604 in the illustrated embodiment. The dome switch 604 can be constructed as any suitable dome switch. As one example, the dome switch can include a conductive dome positioned over a conductive contact. Signal lines or traces can be electrically connected to the conductive dome and to the conductive contact. A deformable structure, such as an elastomeric dome, can be disposed over the conductive dome. The deformable structure compresses based on an applied force, which in turn can cause the conductive dome to collapse and contact the conductive contact. This contact closes a circuit formed with the signal traces, the conductive dome, and the conductive contact, thereby activating the tactile switch. The tactile switch is in a closed or deactivated state when the conductive dome does not contact the conductive contact.

The signal lines or traces connected to the dome switch can be included in the flexible circuit 304. As shown in FIG. 6, the flexible circuit 304 is positioned over the dome switch. The tactile switch structure 306 is described in more detail in conjunction with FIGS. 8 and 9.

Figure 7:
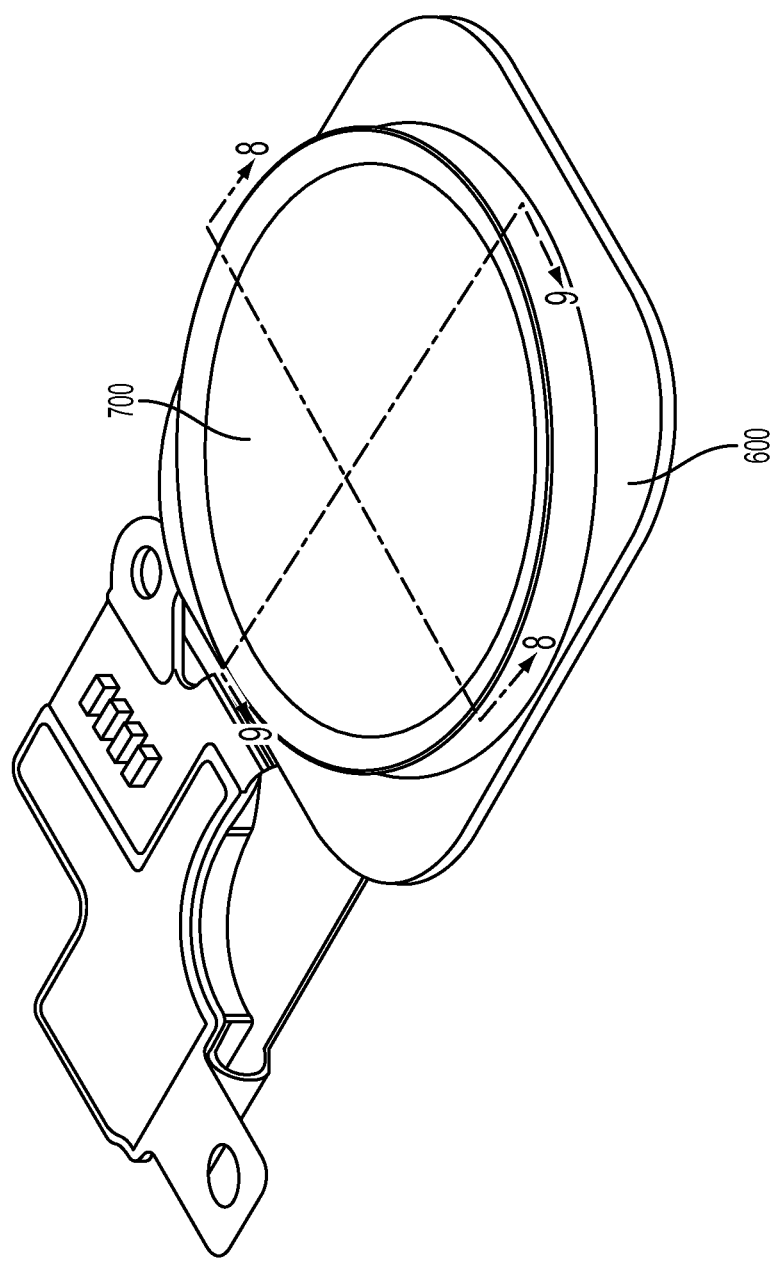
FIG. 7 is a perspective top view of a trim with a cover glass positioned around the tactile switch structure.

Referring now to FIG. 7, there is shown a perspective top view of a trim with a cover glass positioned around the tactile switch structure. A cover glass 700 is disposed in the trim and over the tactile switch structure. The cover glass 700 can be made of any suitable material, including glass, ceramic, and plastic. Additionally, the trim 600 can be made of any suitable material, including metal and plastic.

Figure 8:
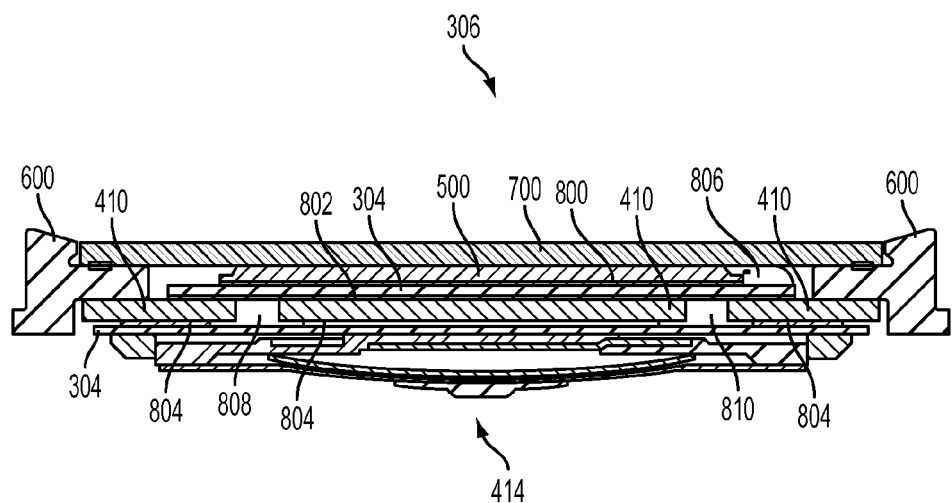
FIG. 8 is a cross-sectional view of the tactile switch structure taken along line 8-8 in FIG. 7.

FIG. 8 is a cross-sectional view of the tactile switch structure taken along line 8-8 in FIG. 7. The tactile switch structure 306 can include the cover glass 700 attached to the trim 600, the integrated circuit or sensor 500 disposed under the cover glass, and the flexible circuit 304 positioned below the sensor 500. The sensor 500 can be attached to the flexible circuit 304 with an adhesive layer 800, such as a heat cured epoxy.

The flexible circuit 304 can wrap around the stiffener 410. Thus, the stiffener 410 can be attached to the bottom surface of the flexible circuit overlying the stiffener 410 with an adhesive layer 802 and to the top surface of the flexible circuit underlying the stiffener 410 with another adhesive layer 804. The adhesive layers 802, 804 can be any suitable type of adhesive, such as, for example, a pressure sensitive adhesive (PSA). As described earlier, the stiffener 410 can be attached to the trim 600 at one or more attachment points.

In one embodiment, the adhesive layer 802 can be a backfill adhesive layer. The sensor 500 and the flexible circuit 304 can be laminated to the cover glass 700 first. A small amount of a liquid adhesive can then be placed on the top surface of the stiffener 410. The stiffener, along with the small amount of liquid adhesive, are then placed against the flexible circuit, which causes the liquid adhesive to spread out between the flexible circuit and the stiffener. The liquid adhesive hardens and becomes stiff, which can assist in providing good tactile feedback to a user when the user presses down on the tactile switch assembly.

The dome switch 414 is electrically connected to the flexible circuit 304 that is positioned under the stiffener 410. A cover structure 806 can be disposed over the wire bonds (see 502 in FIG. 5) to protect the wires.

One or more component chambers 808, 810 can be created in openings in the stiffener 410 by wrapping the flexible circuit 304 around the stiffener 410. The component chambers 808, 810 can be surrounded by the flexible circuit 304 and the stiffener 410. In some embodiments, one or more electrical components can be disposed in the component chambers 808, 810 and electrically connected to the flexible circuit 304. For example, a capacitor or integrated circuit can positioned in a component chamber and can be attached to the flexible circuit 304.

Figure 9:
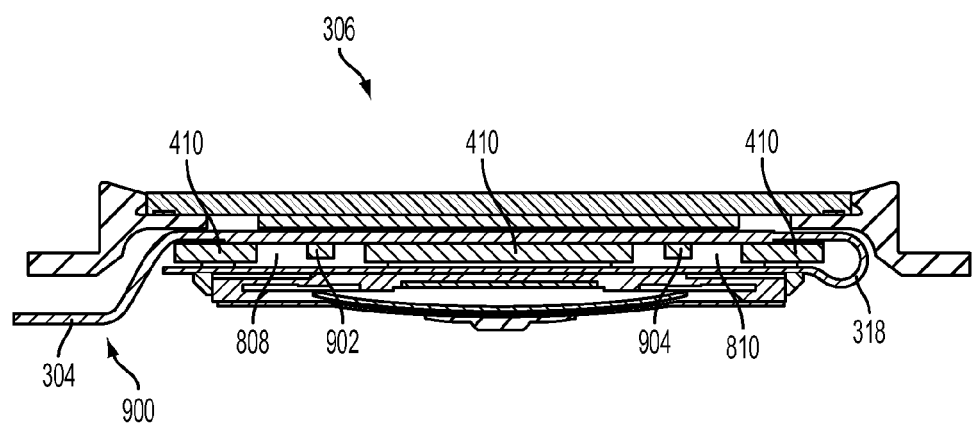
FIG. 9 is a cross-sectional view of the tactile switch structure taken along line 9-9 in FIG. 7.

FIG. 9 is a cross-sectional view of the tactile switch structure taken along line 9-9 in FIG. 7. In the illustrated embodiment, the flexible circuit 304 enters the tactile switch structure at one end 900 and extends over the top surface of the stiffener 410. The flexible circuit 304 then folds over the stiffener 410 at bend region 318 and extends under at least a portion of the bottom surface of the stiffener 410.

As described earlier, the arrangement of the flexible circuit 304 and the stiffener 410 can create one or more component chambers 808, 810. An electrical component or components 902 can be located in the component chamber 808 and electrically connected to the flexible circuit 304. Similarly, one or more electrical components 904 can be located in the component chamber 810 and electrically connected to the flexible circuit 304. The component chambers 808, 810 provide additional locations for electrical components and allow the electrical components 902, 904 to be nested within the tactile switch structure 306.

In the illustrated embodiment, the electrical components 902, 904 are electrically connected to the bottom surface of the overlying flexible circuit 304. In another embodiment, electrical components can be electrically connected to the top surface of the flexible circuit positioned under the stiffener 410. And in some embodiments, electrical components can be electrically connected to both the bottom and top surfaces of the flexible circuit 304.

Various embodiments have been described in detail with particular reference to certain features thereof, but it will be understood that variations and modifications can be effected within the spirit and scope of the disclosure. And even though specific embodiments have been described herein, it should be noted that the application is not limited to these embodiments. In particular, any features described with respect to one embodiment may also be used in other embodiments, where compatible. Likewise, the features of the different embodiments may be exchanged, where compatible.

What is claimed is:

1. A tactile switch assembly, comprising:
   a support plate having opposing first and second sides;
   a tactile switch structure comprising a switch configured to press against the first side of the support plate, wherein the tactile switch structure is electrically connected to a first end of a flexible circuit, the tactile switch assembly has a first length when the flexible circuit is in an unfolded state, the tactile switch assembly has a second length that is less than the first length when the flexible circuit is in a folded state, the flexible circuit folds over itself at least once in the folded state, and a second end of the flexible circuit is located adjacent to the second side of the support plate when the flexible circuit is in the folded state; and
   an electrical component directly coupled and electrically connected to a surface of the flexible circuit, wherein the switch is interposed between the electrical component and the support plate.

2. The tactile switch assembly as in claim 1, wherein the tactile switch structure includes a stiffener positioned adjacent to the switch and the flexible circuit folds over the stiffener in the tactile switch structure.

3. The tactile switch assembly as in claim 2, further comprising at least one component chamber surrounded by the stiffener, the flexible circuit positioned over the stiffener, and the flexible circuit positioned under the stiffener.

4. The tactile switch assembly as in claim 2, wherein the electrical component electrically connected to an additional surface of the flexible circuit.

5. The tactile switch assembly as in claim 1, further comprising a connector electrically connected to the second end of the flexible circuit.

6. The tactile switch assembly as in claim 5, further comprising an additional electrical component electrically connected to the flexible circuit between the tactile switch structure and the connector.

7. The tactile switch assembly as in claim 1, further comprising at least one stiffener attached to a folded portion of the flexible circuit.

8. The tactile switch assembly as in claim 1, the tactile switch structure further comprising a sensor attached to the flexible circuit.

9. The tactile switch assembly as in claim 8, wherein the sensor comprises a fingerprint sensor.

10. The tactile switch assembly as in claim 2, wherein the switch comprises a dome switch.

11. A tactile switch assembly, comprising:
- a flexible circuit, wherein the tactile switch assembly has a first length when the flexible circuit is in an unfolded state, the tactile switch assembly has a second length that is less than the first length when the flexible circuit is in a folded state, and the flexible circuit folds over itself at least once in the folded state;
- a stiffener attached to the flexible circuit, wherein the stiffener has first and second opposing surfaces, the first surface directly contacts a first portion of the flexible circuit when the flexible circuit is in the folded state, and the second surface directly contacts a second portion of the flexible circuit when the flexible circuit is in the folded state;
- a support plate; and
- a tactile switch structure attached to the flexible circuit and interposed between the support plate and the second portion of the flexible circuit, wherein the tactile switch structure comprises:
  - a dome switch that is configured to press against and directly contact the support plate and is electrically connected to an end of the flexible circuit;
  - a cover glass that covers the dome switch and the second portion of the flexible circuit; and
  - a fingerprint sensor interposed between the cover glass and the second portion of the flexible circuit, wherein the fingerprint sensor is electrically connected to the second portion of the flexible circuit.

12. The tactile switch assembly as in claim 11, further comprising an additional stiffener, wherein a first surface of the additional stiffener is attached to the flexible circuit and a portion of a second surface of the additional stiffener is left uncovered by the flexible circuit.

* * * * *